(No Model.)  2 Sheets—Sheet 1.
W. H. THOMAS.
CHESTNUT PERFORATOR.
No. 595,797. Patented Dec. 21, 1897.
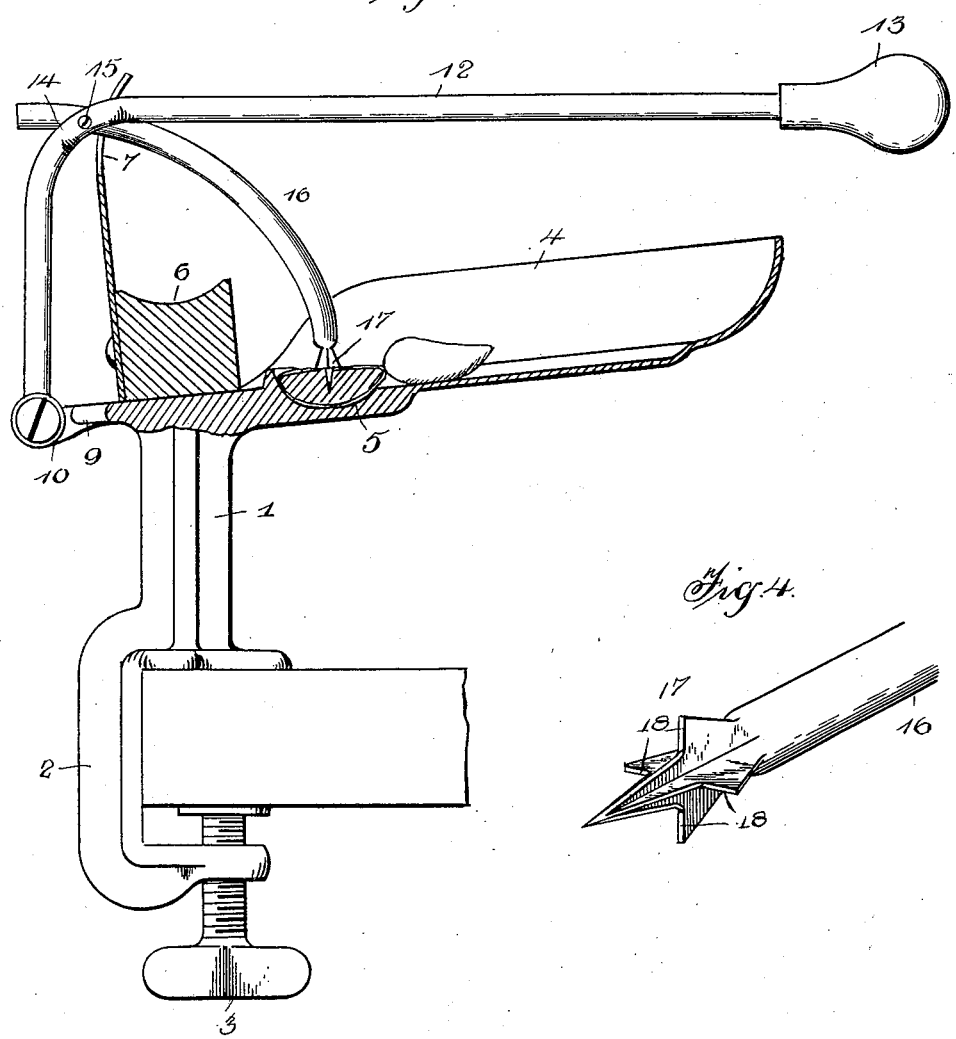
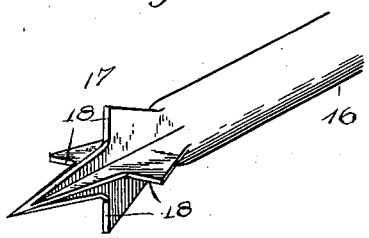
Witnesses
W. F. Doyle
H. J. Ennis.
Inventor
Wm. H. Thomas.
By H. B. Willson.
Attorney

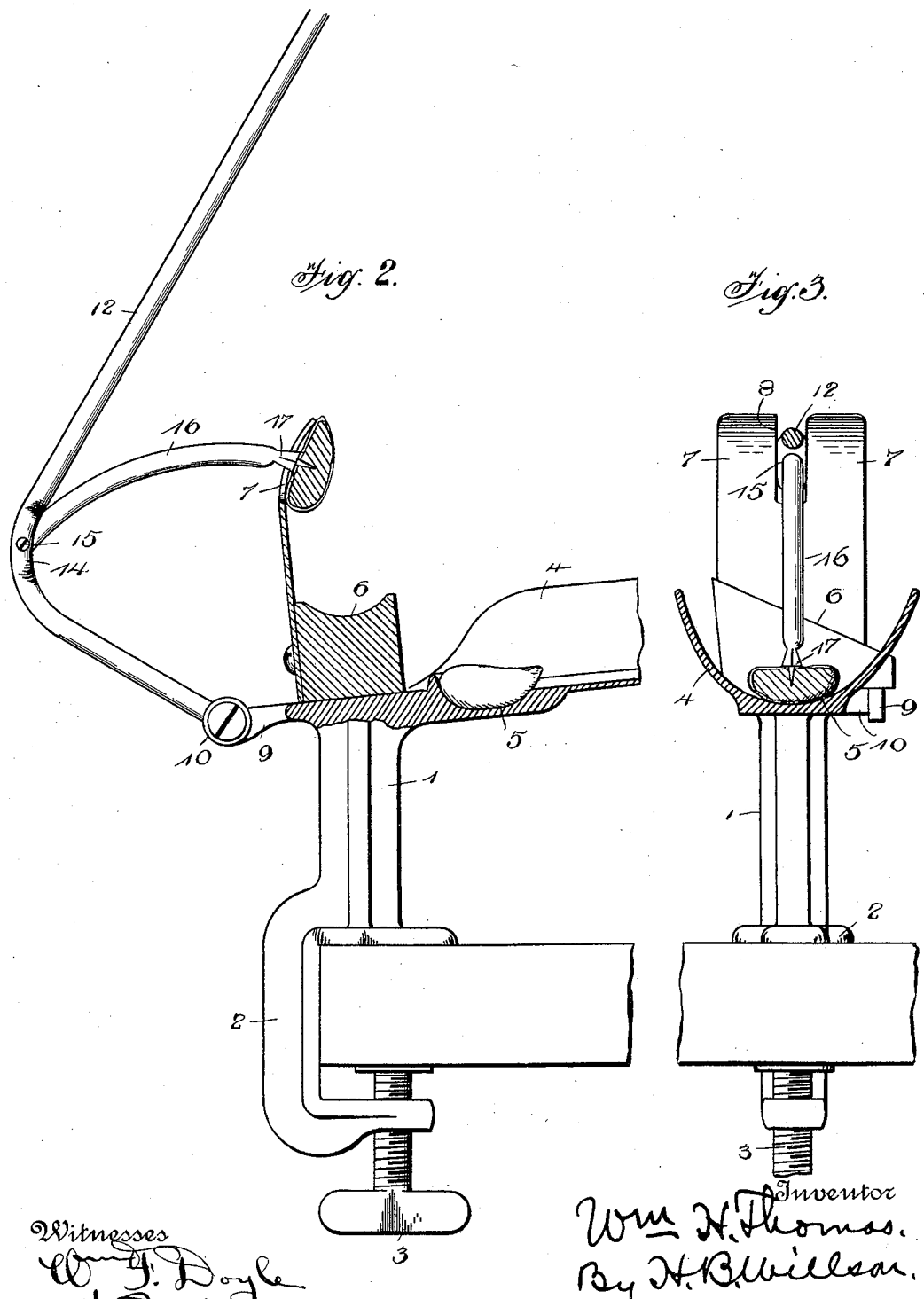

UNITED STATES PATENT OFFICE.

WILLIAM H. THOMAS, OF JENKINTOWN, PENNSYLVANIA.

CHESTNUT-PERFORATOR.

SPECIFICATION forming part of Letters Patent No. 595,797, dated December 21, 1897.

Application filed October 28, 1896. Serial No. 610,340. (No model.)

*To all whom it may concern:*

Be it known that I, WILLIAM H. THOMAS, a citizen of the United States, residing at Jenkintown, in the county of Montgomery and State of Pennsylvania, have invented certain new and useful Improvements in Chestnut-Perforators; and I do declare the following to be a full, clear, and exact description of the invention, such as will enable others skilled in the art to which it appertains to make and use the same.

My invention has relation to improvements in chestnut-perforators, and more particularly to that class of machines which puncture the shell previous to preparing them for roasting; and the object is to provide a simple and convenient tool for expeditiously performing this operation.

To this end the novelty consists in the construction, combination, and arrangement of the same, as will be hereinafter more fully described, and particularly pointed out in the claim.

In the accompanying drawings the same reference-numerals indicate the same parts of the invention.

Figure 1 is a longitudinal section of my improved machine for perforating or puncturing the shells of chestnuts, showing the position of the operating-arm in the act of puncturing the shell of a nut. Fig. 2 is a similar view showing the position of the arm in the act of discharging a punctured nut. Fig. 3 is a transverse section on the line of the pocket, and Fig. 4 is a detail perspective of the puncturing end of the operating-arm.

1 represents a suitable casting provided with a clamp 2 and thumb-screw 3 for conveniently adjusting the device to a table.

4 is an inclined rectangular hopper in the lowest portion of which is a pocket 5 to receive and hold the nut while being cut. Adjoining this pocket is an inclined transverse chute 6, and next to said chute is a sheet-metal guard having fingers 7 7, between which is a vertical recess 8.

9 represents an integral lug on which is pivoted the hub 10 of an operating-arm 12, the free end of which is provided with a handle 13.

14 represents an integral socket on the arm 9, in which is adjustably secured by a set-screw 15 a depending puncturing-arm 16, the lower end of which is formed with a double spear-point 17, having shoulders 18, which act as a guard to limit the point in entering the nut.

The operation of the device is as follows: The nuts are dropped in small quantities into the hopper with the left hand, where they roll one at a time into the pocket 5. The handle 13 is then grasped in the right hand and brought down so that the double spear-point 17 punctures the hull of the nut. The handle is then raised with the nut fast on the spear-point, and as the arm 16 is swung back in the act of raising the handle it passes through the recess 8, which causes the fingers 7 7 to hold the nut while the spear-point is withdrawn from it, and on being released the nut falls by gravity into the chute 6, whence it is discharged into a suitable receptacle.

In practice I do not intend to confine myself to a single puncturing arm and point, but may use two or more, according to the capacity of the machine.

Having thus fully described my invention, what I claim as new and useful, and desire to secure by Letters Patent of the United States, is—

A chestnut-perforator, comprising a hopper, the guard formed with the fingers 7 7, in combination with the pivoted arm 16 having its free end terminating in a double spear-point 17, the individual converging blades of which are formed with blunt right-angular shoulders 18, substantially as shown and described.

In testimony whereof I hereunto affix my signature in presence of two witnesses.

WILLIAM H. THOMAS.

Witnesses:
S. A. TERRY,
GEO. E. TERRY.